United States Patent
Che et al.

(10) Patent No.: US 7,227,711 B2
(45) Date of Patent: Jun. 5, 2007

(54) SYSTEM, METHOD, AND APPARATUS FOR IN-SITU STRAY MAGNETIC FIELD MEASUREMENT

(75) Inventors: Xiaodong Che, Saratoga, CA (US); Wen-Chien David Hsiao, San Jose, CA (US); Yansheng Luo, Fremont, CA (US); Xiaoyu Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 305 days.

(21) Appl. No.: 10/977,678

(22) Filed: Oct. 29, 2004

(65) Prior Publication Data
US 2006/0092543 A1 May 4, 2006

(51) Int. Cl.
*G11B 19/04* (2006.01)
(52) U.S. Cl. .......................................... 360/60; 360/31
(58) Field of Classification Search ..................... None
See application file for complete search history.

(56) References Cited

U.S. PATENT DOCUMENTS

| 5,260,653 | A | 11/1993 | Smith et al. |
| 6,103,545 | A | 8/2000 | Fedeli |
| 6,538,437 | B2 | 3/2003 | Spitzer et al. |
| 6,738,216 | B2 * | 5/2004 | Kawana et al. ............... 360/75 |
| 2003/0067703 | A1 | 4/2003 | Holmes et al. |
| 2004/0075929 | A1 | 4/2004 | Shimizu et al. |

FOREIGN PATENT DOCUMENTS

| GB | 2380047 A | | 3/2003 |
| JP | 03242866 A | * | 10/1991 |
| JP | 07-225901 | | 8/1995 |
| JP | 07225901 A | * | 8/1995 |
| JP | 2003-109293 | | 4/2003 |
| JP | 2003272331 A | * | 9/2003 |

* cited by examiner

*Primary Examiner*—Andrea Wellington
*Assistant Examiner*—Dan I Davidson
(74) *Attorney, Agent, or Firm*—Bracewell & Giuliani LLP

(57) ABSTRACT

A hard disk drive (HDD) detects and measures external stray magnetic fields with existing HDD components. After detecting a strong external magnetic field, read and write operations of the HDD are suspended, and/or other proper corrective actions are taken to minimize loss of data. To measure the stray magnetic field, the magnetic head reader is used as a field sensor. The resistance of the reader changes in the presence of the field, such as with the preamp in the HDD. The resistance also changes with temperature. If the temperature inside the HDD is measured, the resistance change due to temperature is normalized. Even without being able to measure the HDD temperature, the stray magnetic field can be measured with a top head and a bottom head in the HDD. The temperature sensitivity of the reader is thereby cancelled out.

15 Claims, 2 Drawing Sheets

SYSTEM, METHOD, AND APPARATUS FOR IN-SITU STRAY MAGNETIC FIELD MEASUREMENT

BACKGROUND OF THE INVENTION

1. Technical Field

The present invention relates in general to detecting stray magnetic fields in disk drive applications and, in particular, to an improved system, method, and apparatus for protecting a hard disk drive from the potentially harmful effects of stray magnetic fields.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The emerging market for HDDs is expanding very rapidly as HDDs are used in increasingly diverse environments. Some HDDs are used in places where other magnetic objects are present. The stray magnetic field generated by such magnetic objects can interfere with the normal operation of the HDD if the field is strong enough. External magnetic fields can affect both read and write operations of the magnetic heads in HDDs. Moreover, future HDDs probably will use "perpendicular recording," which is even more sensitive to external stray magnetic fields than traditional "longitudinal recording." With longitudinal recording, technology, the magnetization of the disk is in the plane of or parallel to the surface of the disk. However, with perpendicular recording technology, the magnetization is perpendicular to the plane of the surface of the disk. Perpendicular disks have a soft magnetic underlayer that is more sensitive to external stray magnetic fields than traditional, longitudinally recorded disks. Thus, an improved design for at least detecting and/or protecting an HDD from the potentially harmful effects of stray magnetic fields would be desirable, especially as perpendicular disks become more popular.

SUMMARY OF THE INVENTION

One embodiment of a system, method, and apparatus of the present invention measures stray magnetic fields that are external to an HDD with the HDD's existing components. After detecting a significantly strong external magnetic field, read and write operations of the HDD are suspended, and/or other proper corrective actions are taken to minimize the loss of data. In order to measure the stray magnetic field in the HDD, the reader of the magnetic head is used as a field sensor. The resistance of the reader changes in the presence of the stray magnetic field, which may be measured by the preamp in the HDD.

However, the resistance of the reader also is sensitive to and changes with temperature. Thus, in another embodiment, the temperature inside the HDD is measured so that the resistance change due to temperature can be normalized. Even without being able to measure the HDD temperature, the stray magnetic field can be measured with a top head and a bottom head in the HDD when the reader is properly configured. The temperature sensitivity of the resistance of the reader is thereby cancelled out. Since all of the named components already exist in HDDs, the present invention does not require additional components to be provided in HDDs to achieve field measurement of stray magnetic fields.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
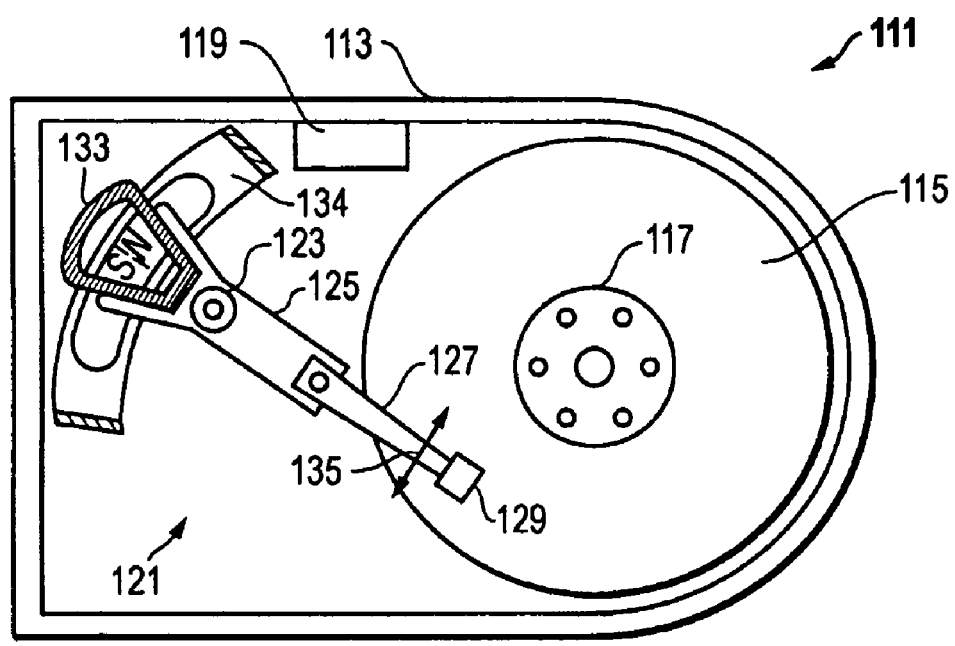
FIG. 1 is a schematic plan view of one embodiment of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
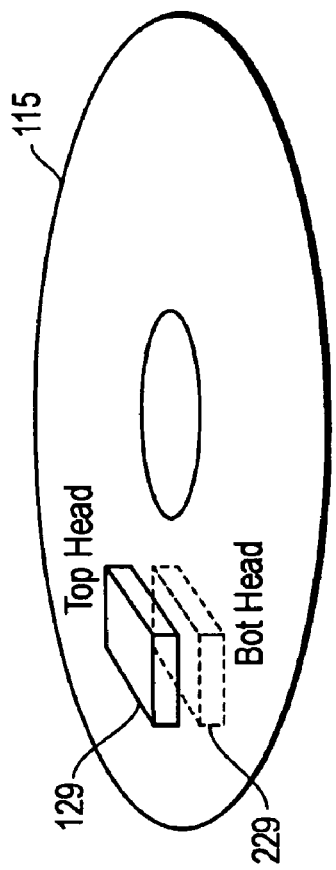
FIG. 2 is an isometric view of a disk and two heads in the disk drive of FIG. 1.
Figure 3:
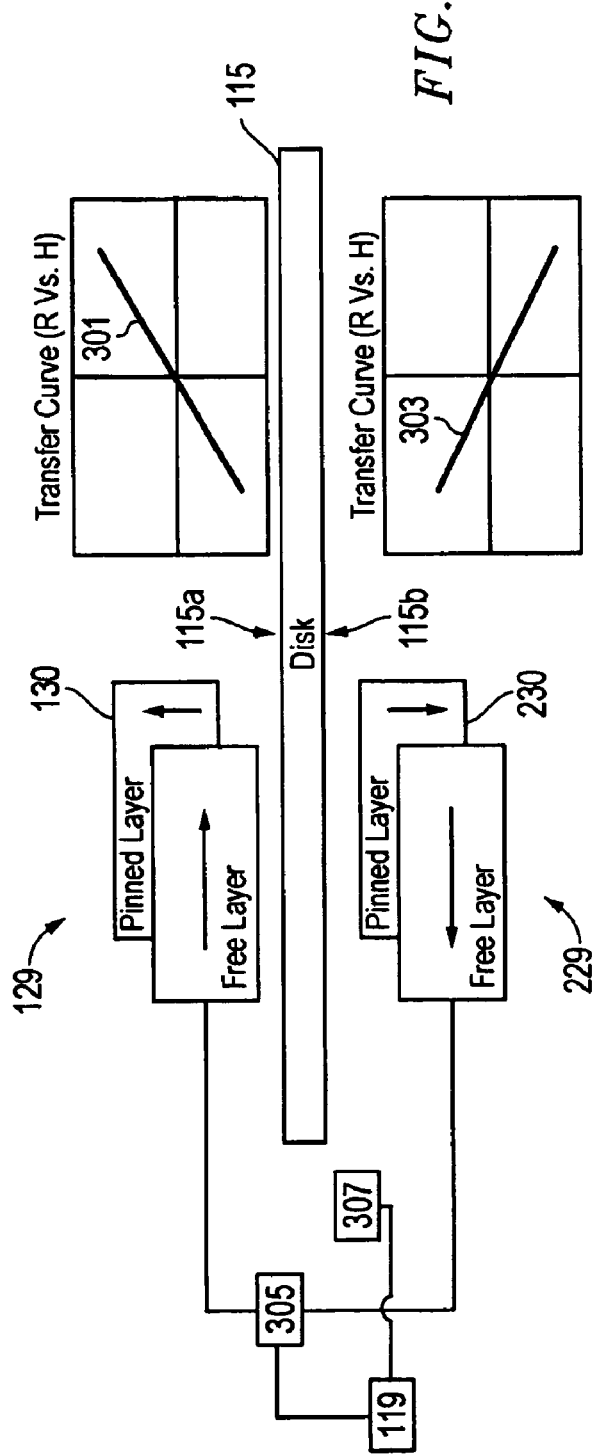
FIG. 3 is a schematic side view of the disk and heads of FIG. 2 illustrating a reader configuration thereof, and associated transfer curves of resistance versus strength of external stray magnetic fields for each head.

Referring now to FIGS. 2 and 3, one embodiment of a control system for the hard disk drive 111 comprises the disk 115 (such as a perpendicular disk) having magnetic media on both opposing sides 115a, 115b, thereof, and a pair of opposed magnetic heads 129, 229 for reading and writing to the opposing sides 115a, 115b, respectively. Although disk 115 is shown equipped with two magnetic media surfaces and hard disk drive includes two heads, the present invention also is operable with a single magnetic media surface and a single head.

As shown in FIG. 3, a reader 130, 230, is associated with each of the magnetic heads 129, 229, respectively, that also are field sensors for detecting and measuring stray magnetic fields that are external to the hard disk drive 111. The magnetization of the pinned layers in heads 129 229 are fixed under magnetic field, while the magnetization of their free layers rotate under magnetic field. Due to GMR effect, the resistance of readers 130, 230 varies as a function of magnetic field as shown in the transfer curves 301, 303. Note that the slopes of the transfer curves 301, 303 are dependent on the relationship of the magnetization of the pinned and free layers.

The controller 119 takes corrective actions to minimize a loss of data due to detection of a stray magnetic field by the heads 129, 229 or readers 130, 230 when a resistance of at least one of the readers 130, 230 changes in a presence of the stray magnetic field. As depicted in the plots on the right side of FIG. 3, the resistances 301, 303 of the readers 130, 230 vary with the strength of stray magnetic fields, and may be measured by a preamp 305 in the hard disk drive 111.

In one embodiment, the controller 119 suspends read and write operations of the hard disk drive 111 when the stray magnetic field is detected. The resistances 301, 303 of the readers 130, 230 also are sensitive to temperature, such that a temperature inside the hard disk drive 111 is measured by a device 307 that works in conjunction with the controller 119. Thus, a change in resistances 301, 303 due to temperature change is normalized prior to taking corrective actions to minimize the loss of data.

The following equations are used in algorithms that represent one embodiment constructed in accordance with the present invention:

Reader Resistance Change with T and H:

$$R1 = R10 + \alpha * dT * R10 + \beta 1 * H$$

$$R2 = R20 + \alpha * dT * R20 - \beta 2 * H$$

If temperature can be measured, only R1 is used to measure H:

$$H = (R10 + \alpha * dT * R10 - R1)/\beta 1$$

If temperature cannot be measured, both R1 and R2 are needed:

$$H = (R1 * R20 - R2 * R10)/(\beta 1 * R20 + \beta 2 * R10)$$

Figure 4:
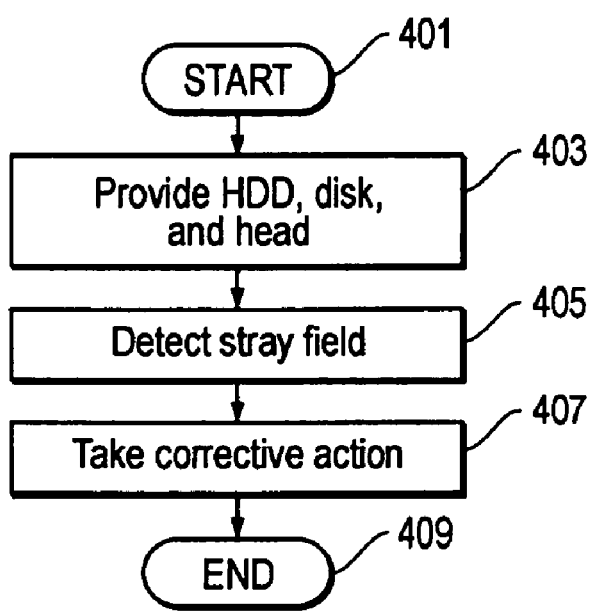
FIG. 4 is a high level flow diagram of one embodiment of a method constructed in accordance with the invention.

Wherein:

R1: Reader resistance for Top head 129
R10: Reader Resistance for Top head 129 at T=T0 and H=0
R2: Reader Resistance for Bottom head 229
R20: Reader Resistance for Bottom head 229 at T=T0 and H=0
α: Reader resistance temperature coefficient
β1: Slope of the reader transfer curve for Top head 129
β2: Slope of the reader transfer curve for Bottom head 229
dT: HDD temperature change
H: External stray field Referring now to FIG. 4, the present invention also comprises a method of protecting data in a hard disk drive. Starting at step 401, the method comprises providing a hard disk drive III with a disk 115 and a head 129 for reading data from and writing data to the disk 115, as illustrated at step 403. Next, as depicted at step 405, the method comprises detecting a stray magnetic field that is external to the hard disk drive 111; and then, as illustrated at step 407, taking corrective actions to minimize a loss of data due to detection of the stray magnetic field.

The method may further comprise measuring a change in a resistance 301 of the head 129 in a presence of the stray magnetic field, and using a reader 130 in the head 129 as a field sensor for detecting the stray magnetic field. The method also may further comprise measuring the resistance 301 of the head 129 with a preamp 305 in the hard disk drive 111, and/or suspending read and write operations of the hard disk drive 111 when the stray magnetic field is detected.

In addition, since the resistance 301 of the head 129 may be sensitive to temperature, the method may further comprise measuring a temperature 307 inside the hard disk drive 111 so that a change in resistance 301 of the head 129 due to temperature change is normalized prior to taking corrective actions to minimize the loss of data, and/or monitoring a second head 229 in the hard disk drive 111 for detecting the stray magnetic field, such that the head 129 and the second head 229 are monitored in conjunction with each other to cancel out a temperature sensitivity of the resistances 301, 303 of the heads 129, 229, before ending at step 409.

The present invention has several advantages, including the ability to measure stray magnetic fields that are external to an HDD with the HDD's existing components. The present invention can thereby prevent data damage by preventing read and/or write operations of the HDD in the presence of such fields. The present invention also works in and compensates for environments where temperature varies, and uses existing HDD components so that very little modification is required.

While the invention has been shown or described in only some of its forms, it should be apparent to those skilled in the art that it is not so limited, but is susceptible to various changes without departing from the scope of the invention.

What is claimed is:

1. A hard disk drive, comprising:
    an enclosure;
    a disk rotatably mounted to the enclosure and having a magnetic media;
    an actuator movably mounted to the enclosure and having a head for reading data from and writing data to the disk, the head also being a field sensor for detecting stray magnetic fields that are external to the hard disk drive;
    a controller for taking corrective actions to minimize a loss of data due to detection of a stray magnetic field with the head when a resistance of the head changes in a presence of the stray magnetic field, wherein the resistance of the head also is sensitive to temperature, such that a temperature inside the hard disk drive is measured so that a change in resistance of the head due to temperature change is normalized prior to taking corrective actions to minimize the loss of data; and
    a second head in the hard disk drive for reading data from and writing data to the disk, and for detecting the stray magnetic field, such that the head and the second head are monitored in conjunction with each other to cancel out a temperature sensitivity of the resistances of the heads.

2. The hard disk drive of claim 1, wherein the head has a reader that is the field sensor for detecting stray magnetic fields.

3. The hard disk drive of claim 1, wherein the resistance of the head is measured by a preamp in the hard disk drive.

4. The hard disk drive of claim 1, wherein the controller suspends read and write operations of the hard disk drive when the stray magnetic field is detected.

5. The hard disk drive of claim 1, wherein the disk is a perpendicular disk.

6. A control system for a hard disk drive, comprising:
    an enclosure;
    a disk rotatably mounted to the enclosure and having a magnetic media on opposing sides thereof;
    an actuator movably mounted to the enclosure and having first and second magnetic heads for reading data from and writing data to the opposing sides of the disk;
    a reader associated with each of the magnetic heads to define a pair of readers, the readers also being field sensors for detecting and measuring stray magnetic fields that are external to the hard disk drive;
    a controller for taking corrective actions to minimize a loss of data due to detection of a stray magnetic field with the readers when a resistance of at least one of the readers changes in a presence of the stray magnetic field, wherein the resistances of the readers also are sensitive to temperature, such that a temperature inside the hard disk drive is measured so that a change in resistances due to temperature change is normalized prior to taking corrective actions to minimize the loss of data; and
    the heads are monitored in conjunction with each other to cancel out a temperature sensitivity of the resistances of the heads.

7. The control system of claim 6, wherein the resistances of the readers are measured by a preamp in the hard disk drive.

8. The control system of claim 6, wherein the controller suspends read and write operations of the hard disk drive when the stray magnetic field is detected.

9. The control system of claim 6, wherein the disk is a perpendicular disk.

10. A method of protecting data in a hard disk drive, comprising:
    (a) providing a hard disk drive with a disk and a head for reading data from and writing data to the disk;
    (b) detecting a stray magnetic field that is external to the hard disk drive; and then
    (c) taking corrective actions to minimize a loss of data due to detection of the stray magnetic field; and further comprising:
    (d) measuring a temperature inside the hard disk drive so that a change in resistance of the head due to temperature change is normalized prior to taking corrective actions to minimize the loss of data; and
    (e) monitoring a second head in the hard disk for detecting the stray magnetic field, such that the head and the second head are monitored in conjunction with each other to cancel out a temperature sensitivity of the resistances of the heads.

11. The method of claim 10, wherein step (b) comprises measuring a change in the resistances of the heads in a presence of the stray magnetic field.

12. The method of claim 11, wherein step (b) comprises using readers in the heads as field sensors for detecting the stray magnetic field.

13. The method of claim 10, further comprising measuring the resistances of the heads with preamps in the hard disk drive.

14. The method of claim 10, wherein step (c) comprises suspending read and write operations of the hard disk drive when the stray magnetic field is detected.

15. The method of claim 10, wherein step (a) comprises providing the disk as a perpendicular disk.

* * * * *